United States Patent [19]
Dunne et al.

[11] Patent Number: 6,008,973
[45] Date of Patent: Dec. 28, 1999

[54] CIRCUIT BREAKER INCLUDING INTERFACE TO CONVERT A RECTIFIED SIGNAL TO A SINUSOIDAL SIGNAL

[75] Inventors: David J. Dunne; Robert J. Erger, both of Cedar Rapids, Iowa

[73] Assignee: Square D Company, Palatine, Ill.

[21] Appl. No.: 09/085,979

[22] Filed: May 27, 1998

[51] Int. Cl.[6] .................................................. H02H 3/00
[52] U.S. Cl. ........................................ 361/93.6; 361/102
[58] Field of Search .............................. 361/93–99, 102, 361/115, 42–50, 93.1–93.9

[56] References Cited

U.S. PATENT DOCUMENTS

| | | | |
|---|---|---|---|
| 3,818,275 | 6/1974 | Shimp ........................................ | 361/94 |
| 4,080,640 | 3/1978 | Elms et al. ................................. | 361/45 |
| 4,736,265 | 4/1988 | Gyongyosi et al. ....................... | 361/45 |
| 4,839,770 | 6/1989 | Ruta .......................................... | 361/93 |
| 5,038,246 | 8/1991 | Durivage, III ............................. | 361/93 |
| 5,276,416 | 1/1994 | Ozaki ........................................ | 335/18 |

*Primary Examiner*—Michael J. Sherry
*Attorney, Agent, or Firm*—Kareem M. Irfan; Larry I. Golden

[57] ABSTRACT

A circuit breaker and method for interrupting the flow of electric current in a line includes connecting separable contacts to a conductor in the circuit. An actuating device, actuated by an activating signal, is connected to the separable contacts to effect separation of the contacts wherein the flow of electric current in the circuit is interrupted. A current sensor, such as an iron core current transformer, senses the current in the circuit to provide a first sinusoidal signal. A bridge rectifier is connected to the current sensor wherein the first sinusoidal signal is converted to a rectified signal and power is derived from the rectified signal. An interface circuit connected to the rectifying network converts the rectified signal into a second sinusoidal signal for providing the activating signal to the actuating device at a predetermined magnitude of the first sinusoidal signal. The interface circuit includes generating a sign bit indicative of the polarity of the first sinusoidal signal. A switch, such as a complimentary metal-oxide silicon (CMOS) switch, generates a positive half-wave rectified signal and a negative half-wave rectified signal from the rectified signal and the sign bit. The negative half-wave rectified signal is inverted and the positive half-wave rectified signal and the inverted negative half-wave rectified signal are summed and level shifted relative to the magnitude of the first sinusoidal signal to generate a second sinusoidal signal in phase with the first sinusoidal signal.

28 Claims, 3 Drawing Sheets

CIRCUIT BREAKER INCLUDING INTERFACE TO CONVERT A RECTIFIED SIGNAL TO A SINUSOIDAL SIGNAL

BACKGROUND OF THE INVENTION

1. Field of the Invention

This invention relates to the use of an interface circuit to convert a rectified alternating current (AC) signal to a sinusoidal AC signal in a circuit breaker electronic trip unit (ETU).

2. Description of the Related Art

Currently, large circuit breaker electronic trip units include an iron core current transformer and an air core current transformer wherein the iron core current transformer supplies power to the ETU and the air core current transformer provides a sinusoidal signal to perform protection and metering functions. The ETU uses the air core current transformers to detect the magnitude of the current flowing through each phase of a multi-phase circuit breaker. The output of the air core current transformer is a sinusoidal signal, for example, a 60 Hz sinusoidal signal, from which power is not derived. The sinusoidal signal is integrated and input into a microprocessor based Application Specific Integrated Circuit (ASIC). The signal input into the ASIC is typically a sinusoidal signal having a maximum amplitude of ±1.25 Vac riding on a ±2.5 Vdc relative to system ground.

Smaller electronic trip unit circuit breakers, because of limited physical space, typically include only an iron core current transformer used to provide both power and sensing to the ETU but do not include an air core current transformer for providing a sinusoidal signal to an ASIC. Therefore, the small circuit breakers usually do not have the metering capabilities as provided by the large circuit breakers. It would be advantageous to provide a small circuit breaker and ETU having only an iron core current transformer to use the ASIC microprocessor as used in the larger circuit breakers having an iron core current transformer and an air core current transformer. The smaller circuit breakers typically sell at higher volumes thereby allowing the ASIC development cost to be spread out over the increased volumes. The cost of the ASIC is thereby lowered per unit as well as providing for increased functions such as a ground fault protection to the smaller circuit breakers having only an iron core current transformer.

SUMMARY OF THE INVENTION

A circuit breaker and method for interrupting the flow of electric current in a line is disclosed including connecting separable contacts to a conductor in the circuit. An actuating device, actuated by an activating signal, is connected to the separable contacts to effect separation of the contacts wherein the flow of electric current in the circuit is interrupted. A current sensor, such as an iron core current transformer, senses the current in the circuit to provide a first sinusoidal signal. A rectifying network, for example, a bridge rectifier, is connected to the current sensor wherein the first sinusoidal signal is converted to a rectified signal and power is derived from the rectified signal. An interface circuit connected to the rectifying network converts the rectified signal into a second sinusoidal signal for providing the activating signal to the actuating device at a predetermined magnitude of the first sinusoidal signal.

The interface circuit includes a polarity detecting network, for example, a comparator and resistor network, for generating a sign bit indicative of the polarity of the first sinusoidal signal. A switch, such as a complimentary metal-oxide silicon (CMOS) switch, is connected to the rectifying network and the polarity detector network to generate a positive half-wave rectified signal and a negative half-wave rectified signal from the rectified signal and the sign bit. The negative half-wave rectified signal is inverted and the positive half-wave rectified signal and the inverted negative half-wave rectified signal are summed to generate a second sinusoidal signal in phase with the first sinusoidal signal. A zener diode and resistor network is connected to the summing amplifier wherein the second sinusoidal signal is level shifted relative to the magnitude of the first sinusoidal signal.

In another embodiment of the present invention, for a multiphase circuit breaker in a multiphase circuit path, separate current sensors, rectifying networks and interface circuits are used corresponding to each phase of the multiphase circuit path and also the neutral line.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE PREFERRED EMBODIMENTS

Figure 1:
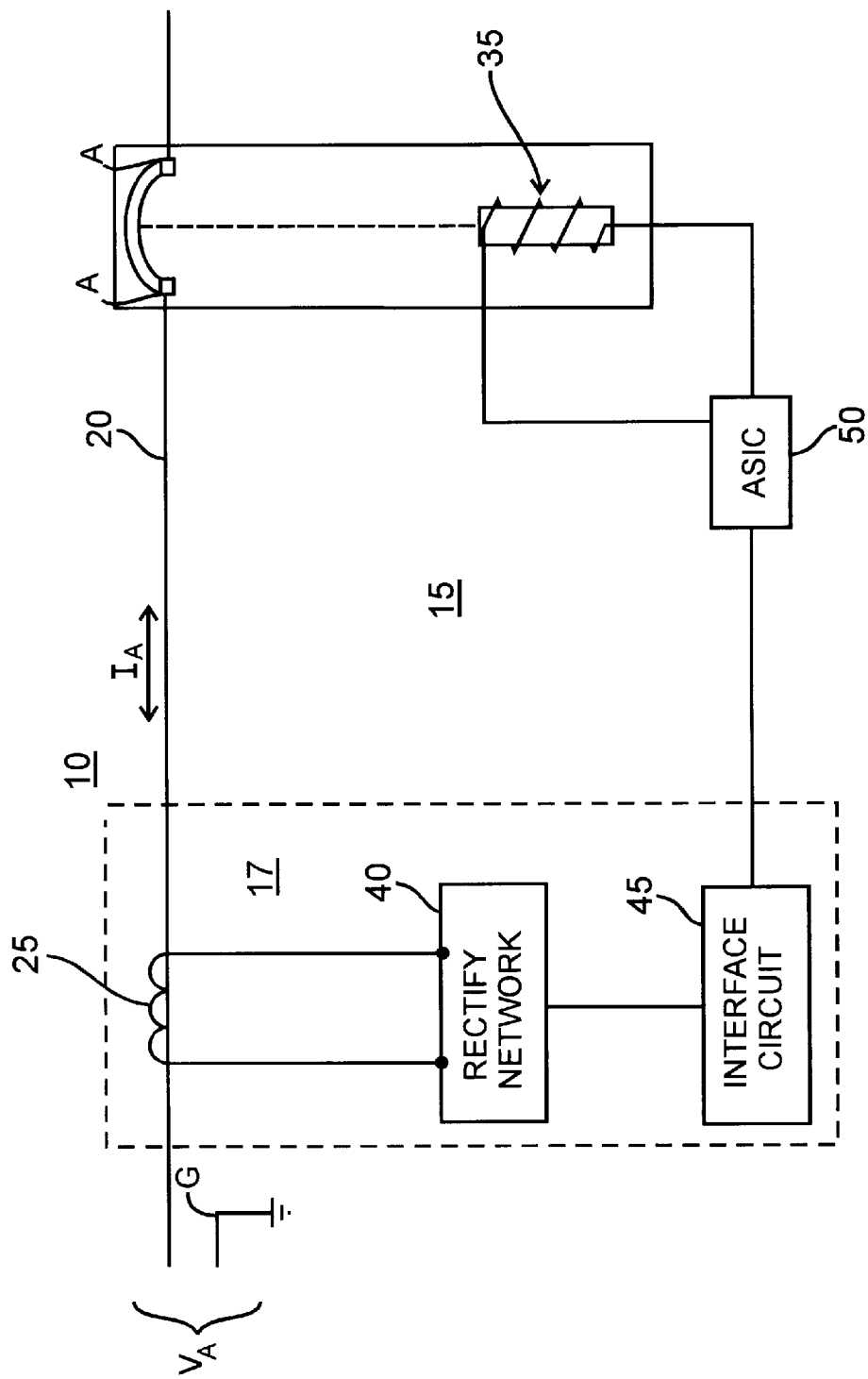
FIG. 1 is a diagrammatic view of a single phase line protected by a circuit breaker including the electronic trip unit and interface circuit of the present invention.

FIG. 1 illustrates an electrical circuit 10 having a circuit breaker 15 for interrupting the flow of electric current in the electrical circuit 10 and connected to, for example, a single phase line 20 or conductor. Separable contacts A—A are connected to the line 20 and an actuating device 35, such as a relay coil, is connected to the separable contacts A—A. The actuating device 35 is actuated by an activating signal to effect separation of the separable contacts A—A wherein the flow of electric current in the electrical circuit 10 is interrupted. The relay coil is actuated by an activating signal such as a predetermined current or voltage level.

The circuit breaker 15 is, for example, a small, low voltage electronic trip circuit breaker including an electronic trip unit 17 having a current sensor 25 for sensing the current on the line 20. The circuit breaker 15 of the present invention provides long time, short time, instantaneous and ground fault protection to the electrical circuit 10. The circuits of the electronic trip unit 17 are described in greater detail in FIG. 2. The current sensor 25 is, for example, an iron core current transformer, and is connected to the line 20. The current in the current sensor 25 is linearly proportional to the main current $I_A$ in the line 20. The current sensor 25 senses the current in the electrical circuit 10 and provides a first sinusoidal signal. For example, the electronic trip circuit breaker 15 is a low voltage circuit breaker and the current sensor 25, the iron core current transformer, transmits a 60 HZ sinusoidal signal representative of the current on the line 20.

The current sensor 25 is connected to a rectifying network 40 at terminals 27 and 28. The rectifying network 40 converts the first sinusoidal signal to a rectified signal for deriving power for the electronic trip unit 17 from the rectified signal. An interface circuit 45 is connected to the rectifying network 40 for converting the rectified signal to a second sinusoidal signal. The second sinusoidal signal is a reconstruction of the first sinusoidal signal sensed by the current sensor 25. The second sinusoidal signal is used to energize a trip initiating voltage at a predetermined magnitude of the first sinusoidal signal and provides the activating signal to the actuating device 35 to effect separation of the separable contacts A—A. An application specific integrated circuit 50 (ASIC), for example, receives the second sinusoidal signal and is used for protection capabilities in activation of the actuating device 35. The line 20 may have flowing therein bi-directional or alternating current $I_A$. The voltage impressed between line 20 and the ground or system common is designated $V_A$. It is to be understood that system common G may be replaced by another electrical line or conductor similar to line 20 and that the operation of electrical circuit 10 is not dependent on voltage $V_A$ being developed between line 20 and a ground terminal exclusively.

Figure 2:
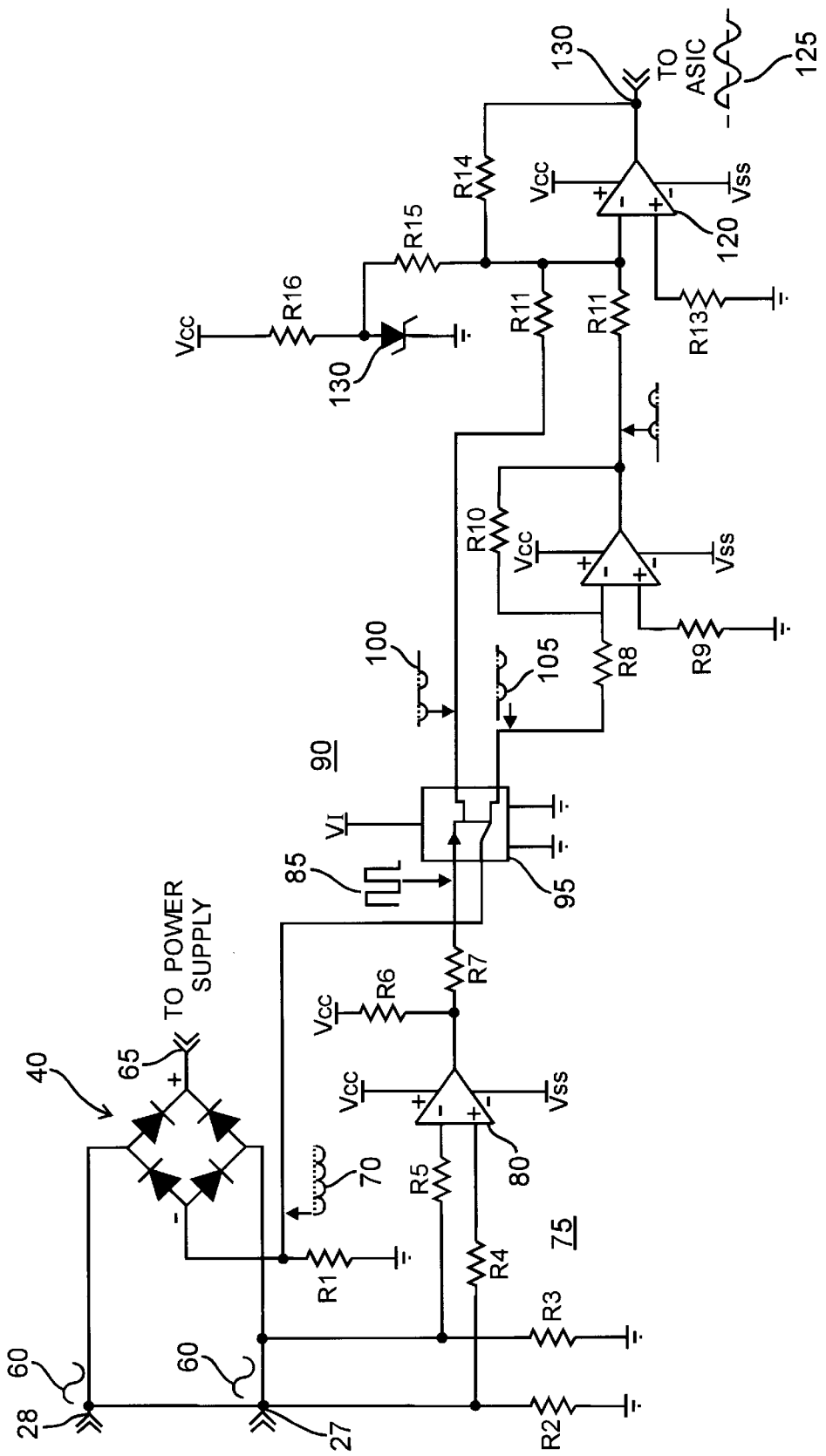
FIG. 2 is a schematic diagram of the rectifying network and the interface circuit portions of the electrical circuit illustrated in FIG. 1.

FIG. 2 is a diagrammatic view illustrating the electronic trip unit 17 in greater detail. The arrows indicate the current flow and possible wave shapes for the currents are illustrated. The output terminals 27 and 28 of the current sensor are connected to the input terminals of the rectifying network 40. The rectifying network 40 is, for example, a full-wave bridge rectifier circuit that converts a sinusoidal signal to a rectified signal. The rectified signal from the rectifying network 40 provides power to a power supply for the electronic trip unit 17 at terminal 65. The power supply generates three voltages; a first voltage for the energy required to activate the trip solenoid, a voltage Vcc of +5 volts, for example, required for the ASIC, and a voltage Vss of −5 volts required for the negative supply inputs on the various comparators and amplifiers in the circuitry.

The rectifying network 40 is connected to an interface circuit 90 including a burden resistor R1 to ground and connected to the rectifying network 40 on the negative side of the full-wave bridge rectifier. Before the rectifying network 40, the current sensor 25 output terminals 27 and 28 are connected to resistors R2 and R3 to ground and through buffer resistors R4 and R5 to a voltage comparator 80. The combination of the voltage comparator 80 and resistors R2, R3, R4 and R5 provide a polarity detection network 75 for detecting the polarity of the signal output form the current sensor 25.

A switch 95 having a normally closed contact, such as a single pole, double throw (SPDT) complimentary metal-oxide silicon (CMOS) switch, is connected to the rectifying network 40 and the polarity detector network 75. The polarity signal from the voltage comparator 80 of the polarity detection network 75 is used as the control signal for the switch 95. The polarity signal from the polarity detection network 75 is connected to the switch 95 through pull-up resistor R6 and buffer resistor R7. The output of the switch 95 is a split signal shown as a positive half-wave rectified signal 100 and a negative half-wave rectified signal 105, for example, 180 degrees out of phase. The negative half-wave rectified signal 105 output is connected to an analog inverter 110, for example, an operational amplifier, through buffer resistor R8 at the negative input of the analog inverter 110 with the positive input connected to ground through resistor R9 to provide an inverted negative half-wave rectified signal 115. Resistor R10 is used as an offset compensating resistor for analog inverter 110.

An inverted summing amplifier 120, for example, an operational amplifier configured as an inverting summing amplifier, is connected to the switch 95 and the analog inverter 110 for providing a scaled and level shifted inverted sum signal of the positive half-wave rectified signal 100 and the inverted negative half-wave rectified signal 115. The inverted negative half-wave rectified signal 115 and the positive half-wave rectified signal 100 are connected to the negative input of the summing amplifier 120 through resistors R11 and R12, respectively, including resistor R14 and offset resistor R13 connected to ground. A regulating Zener diode 130 is connected at its cathode to ground and at its anode to voltage Vss through resistor R16 and to the summing amplifier 120 through resistor R15.

In operation, the presence of a current $I_A$ in the line 20 causes energization of the current sensor 25 which, in turn, generates the alternating transformer secondary current, shown as the first sinusoidal signal 60. The current in the current sensor 25 is linearly proportional to the main current $I_A$ in the line 20. The current sensor 25 senses the current in the electrical circuit 10 and provides the first sinusoidal signal 60, for example, a 60 HZ sinusoidal signal representative of the current $I_A$ in the line 20. The first sinusoidal signal 60 is provided to the rectifying network 40 at terminals 27 and 28 wherein the first sinusoidal signal 60 is converted to a rectified signal. The rectified signal form the rectifying network 40 provides power to the electronic trip unit 17 at terminal 65.

The interface circuit 90 connected to the rectifying network 40 converts the rectified signal to a second sinusoidal signal for energizing a trip initiating voltage at a predetermined magnitude of the first sinusoidal signal. The burden resistor R1 on the negative side of the full-wave bridge rectifier providing an indication of the magnitude of the first sinusoidal signal shown as sinusoidal signal 70. The sinusoidal signal 70 is a rectified alternating current signal with a negative (below ground) amplitude.

Before the first sinusoidal signal 60 is rectified, the polarity of the first sinusoidal signal 60 is detected using the voltage comparator 80. The output of the voltage comparator 80, shown as square wave signal 85, is indicative of the polarity of the first sinusoidal signal 60. When the first sinusoidal signal 60 is positive, the non-inverting input of the voltage comparator 80 is positive with respect to the inverting input forcing the output of the voltage comparator 80 high, or a positive sign bit. When the first sinusoidal signal 60 is negative, the non-inverting input of the voltage comparator 80 is negative with respect to the inverting input and the output of the voltage comparator 80 is pulled low, or a negative sign bit.

After the polarity of the first sinusoidal signal is determined, the first sinusoidal signal 60 is rectified and input into the power supply at terminal 65. The return path of the rectified signal is through burden resistor R1, through the negative side of the bridge rectifier of the rectifying network 40 and back to the current sensor 25. The signal across burden resistor R1 is a rectified alternating current waveform 70 with a negative amplitude wherein the current is pulled from ground. The rectified alternating current waveform 70 and the sign bit square wave signal 85 are input into the CMOS switch 95 which splits the rectified alternating current waveform 70 to generate a positive half-wave rectified signal 100 and a negative half-wave rectified signal 105, for example 180 degrees out of phase.

The sign bit square wave signal 85 is used as the control signal for the CMOS switch 95. The a negative half-wave rectified signal 105 is inverted with analog inverter 110 to provide the inverted negative half-wave rectified signal 115.

The summing amplifier 120 provides an inverted sum signal of the positive half-wave rectified signal 100 and the inverted negative half-wave rectified signal 115 in phase with the first sinusoidal signal 60, wherein the second sinusoidal signal 125 is generated. The second sinusoidal signal 125 is scaled and level shifted relative to the magnitude of the first sinusoidal signal 60 wherein the second sinusoidal signal 125 is a reconstruction of the first sinusoidal signal 60. The second sinusoidal signal 125 is then provided at terminal 130 to the ASIC as shown in FIG. 1.

Figure 3:
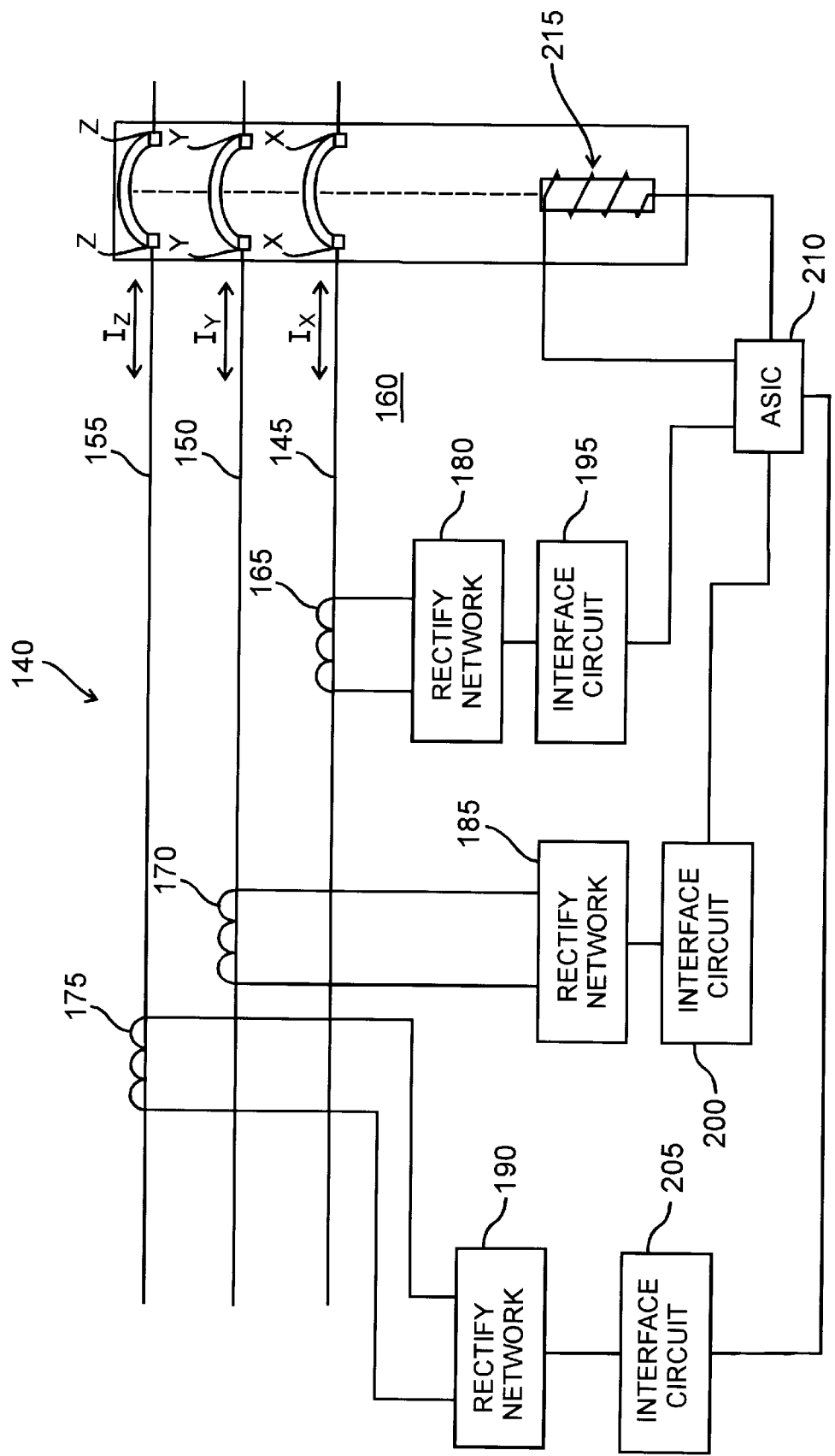
FIG. 3 is a diagrammatic view of a three-phase circuit breaker and interface circuit arrangement according to the present invention.

Referring now to FIG. 3, a three-phase circuit 140 lines 145, 150 and 155 connected to separable contacts X—X, Y—Y and Z—Z, respectively, may be associated with the previously described circuit breaker 15 of electrical circuit 10. The multiphase circuit breaker 160 is essentially the same as described before except that a separate current sensor 165, 170 and 175, connected to separate rectifying networks 180, 185 and 190 and separate interface circuits 195, 200 and 205, respectively, are required for each phase of a multiphase circuit. A current sensor, rectifying network and interface circuit are also connected with the neutral (not shown) of the three-phase circuit 140. The outputs of the separate interface circuits are connected to the ASIC for protection and metering capabilities in activation of an actuating device 215 for effecting separation of separable contacts X—X, Y—Y and Z—Z, respectively.

The method and apparatus of the present invention provide for a small circuit breaker having only an iron core current transformer to provide a rectified signal and power to the ETU while also converting rectified signal and reconstructing the sinusoidal signal for use in an application specific integrated circuit as used in the larger circuit breakers having both an iron core current transformer and an air core current transformer.

While preferred embodiments have been shown and described, various modifications and substitutions may be made thereto without departing from the spirit and scope of the invention. Accordingly it is to be understood that the present invention has been described by way of illustrations and not limitations.

What is claimed is:

1. A circuit breaker electronic trip unit comprising:
    a current sensor connected to a conductor of a circuit to be protected for providing a first sinusoidal signal;
    a rectifying network connected to the current sensor wherein the first sinusoidal signal is converted to a rectified signal and wherein power for said trip unit is derived from said rectified signal; and
    an interface circuit connected to the rectifying network wherein the rectified signal is converted to a second sinusoidal signal for energizing a trip initiating voltage at a predetermined magnitude of the first sinusoidal signal.

2. A trip unit, as recited in claim 1, wherein the interface circuit further comprises:
    a burden resistor connected to the rectifying network for providing an indication of the magnitude of the first sinusoidal signal;
    a polarity detector network connected to the current sensor for generating a sign bit indicative of the polarity of the first sinusoidal signal;
    a switch connected to the rectifying network and the polarity detector network to generate a positive half-wave rectified signal and a negative half-wave rectified signal;
    an inverter connected to the negative half-wave rectified signal;
    an inverting summing amplifier for providing an inverted sum signal of the positive half-wave rectified signal and the inverted negative half-wave rectified signal in phase with the first sinusoidal signal, wherein the second sinusoidal signal is generated.

3. A trip unit, as recited in claim 2, wherein the inverting summing amplifier is configured including a zener diode and resistor network.

4. A trip unit, as recited in claim 1, wherein the current sensor is an iron core current transformer.

5. A trip unit, as recited in claim 1, wherein the rectifying network is a bridge rectifier.

6. A trip unit, as recited in claim 2, wherein the polarity detector network includes a voltage comparator and resistors.

7. A trip unit, as recited in claim 2, wherein the switch is a complimentary metal-oxide silicon switch.

8. A trip unit, as recited in claim 7, wherein the complimentary metal-oxide silicon switch is a single-pole, double-throw complimentary metal-oxide silicon switch.

9. A trip unit, as recited in claim 2, wherein the positive half-wave rectified signal and the negative half-wave rectified signal are 180 degrees out of phase.

10. A circuit breaker for interrupting a flow of current in a multiphase circuit path between at least one source and at least one load, the circuit breaker comprising:
    separable contacts connected to a conductor in each phase in the multiphase circuit path;
    an actuating device, actuated by an activating signal, connected to each of the separable contacts to effect separation of the contacts wherein the flow of electric current is interrupted;
    an electronic trip unit including;
        a current sensor connected to a conductor in each phase in the multiphase circuit path for providing a first sinusoidal signal corresponding to each phase;
        a rectifying network associated with and connected to each current sensor wherein the first sinusoidal signal is converted to a rectified signal providing power for said electronic trip unit; and
        an interface circuit connected to each rectifying network wherein the rectified signal is converted to a second sinusoidal signal corresponding to each phase, wherein the second sinusoidal signal is a scaled reconstruction of the first sinusoidal signal, said second sinusoidal signal energizing a trip initiating voltage at a predetermined magnitude of the corresponding first sinusoidal signal.

11. A circuit breaker, as recited in claim 10, wherein the interface circuit further comprises:
    a burden resistor connected to the rectifying network for providing an indication of the magnitude of the first sinusoidal signal;
    a polarity detector network connected to the current sensor for generating a sign bit indicative of the polarity of the first sinusoidal signal;
    a switch connected to the rectifying network and the polarity detector network to generate a positive half-wave rectified signal and a negative half-wave rectified signal;
    an inverter connected to the negative half-wave rectified signal;
    an inverting summing amplifier for providing an inverted sum signal of the positive half-wave rectified signal and the inverted negative half-wave rectified signal in phase with the first sinusoidal signal, wherein the second sinusoidal signal corresponding to each phase is generated.

12. A circuit breaker, as recited in claim 11, wherein the inverting summing amplifier is configured including a zener diode and resistor network.

13. A circuit breaker, as recited in claim 10, wherein the current sensor is an iron core current transformer.

14. A circuit breaker, as recited in claim 10, wherein the rectifying network is a bridge rectifier.

15. A circuit breaker, as recited in claim 11, wherein the polarity detector network includes a voltage comparator and resistors.

16. A circuit breaker, as recited in claim 11, wherein the switch is a complimentary metal-oxide silicon switch.

17. A circuit breaker, as recited in claim 16, wherein the complimentary metal-oxide silicon switch is a single-pole, double-throw complimentary metal-oxide silicon switch.

18. A circuit breaker, as recited in claim 11, wherein the positive half-wave rectified signal and the negative half-wave rectified signal are 180 degrees out of phase.

19. A method for interrupting the flow of electric current in a circuit comprising:
   connecting separable contacts to a conductor in the circuit;
   connecting an actuating device, actuated by an activating signal, to the separable contacts to effect separation of the contacts wherein the flow of electric current in the circuit is interrupted;
   sensing the current in the circuit to provide a first sinusoidal signal having a first magnitude;
   rectifying the first sinusoidal signal to obtain a rectified signal, said rectified signal providing power to the actuating device; and
   converting the rectified signal into a second sinusoidal signal for providing the activating signal to the actuating device wherein the second sinusoidal signal is a scaled reconstruction of the first sinusoidal signal.

20. A method, as recited in claim 19, wherein converting the rectified signal into a second sinusoidal signal further comprises:
   generating a sign bit indicative of the polarity of the first sinusoidal signal;
   generating a positive half-wave rectified signal and a negative half-wave rectified signal from the rectified signal and the sign bit;
   inverting the negative half-wave rectified signal; and
   summing the positive half-wave rectified signal and the inverted negative half-wave rectified signal wherein the second sinusoidal signal is generated.

21. A method, as recited in claim 20, further comprising:
   inverting the sum of the positive half-wave rectified signal and the inverted negative half-wave rectified signal in phase with the first sinusoidal signal.

22. A method, as recited in claim 21, further comprising:
   level shifting the inverted sum of the positive half-wave rectified signal and the inverted negative half-wave rectified signal relative to the magnitude of the first sinusoidal signal.

23. A method, as recited in claim 19, further comprising:
   using the second sinusoidal signal as an input signal for an application specific integrated circuit for controlling the actuating device.

24. A method, as recited in claim 20, wherein the positive half-wave rectified signal and the negative half-wave rectified signal are 180 degrees out of phase.

25. A method for interrupting the flow of electric current in a circuit comprising:
   connecting separable contacts to a conductor in the circuit;
   connecting an actuating device, actuated by an activating signal, to the separable contacts to effect separation of the contacts wherein the flow of electric current in the circuit is interrupted;
   sensing the current in the circuit to provide a first sinusoidal signal;
   rectifying the first sinusoidal signal wherein the first sinusoidal signal is converted to a rectified signal;
   deriving power from said rectified signal;
   providing an indication of the magnitude of the first sinusoidal signal;
   generating a sign bit indicative of the polarity of the first sinusoidal signal;
   generating a positive half-wave rectified signal and a negative half-wave rectified signal from the rectified signal and the sign bit;
   inverting the negative half-wave rectified signal;
   summing the positive half-wave rectified signal and the inverted negative half-wave rectified signal;
   inverting the sum of the positive half-wave rectified signal and the inverted negative half-wave rectified signal in phase with the first sinusoidal signal; and
   wherein a second sinusoidal signal is generated for providing the activating signal to the actuating device at a predetermined magnitude of the first sinusoidal signal.

26. A method, as recited in claim 25, further comprising:
   level shifting the inverted sum of the positive half-wave rectified signal and the inverted negative half-wave rectified signal relative to the magnitude of the first sinusoidal signal.

27. A method, as recited in claim 25, further comprising:
   using the second sinusoidal signal as an input signal for an application specific integrated circuit for controlling the actuating device.

28. A method for rectifying and reconstructing a sinusoidal signal comprising:
   providing a first sinusoidal signal;
   rectifying the first sinusoidal signal wherein the first sinusoidal signal is converted to a rectified signal wherein power is derived from said rectified signal;
   providing an indication of the magnitude of the first sinusoidal signal;
   generating a sign bit indicative of the polarity of the first sinusoidal signal;
   generating a positive half-wave rectified signal and a negative half-wave rectified signal from the rectified signal and the sign bit;
   inverting the negative half-wave rectified signal;
   summing the positive half-wave rectified signal and the inverted negative half-wave rectified signal;
   inverting the sum of the positive half-wave rectified signal and the inverted negative half-wave rectified signal in phase with the first sinusoidal signal;
   scaling and level shifting the inverted sum of the positive half-wave rectified signal and the inverted negative half-wave rectified signal relative to the magnitude of the first sinusoidal signal; and
   wherein a second sinusoidal signal is generated.

* * * * *